Patented Oct. 31, 1950

2,527,839

UNITED STATES PATENT OFFICE 2,527,839

SUGAR CARBAMATES AND RESINOUS CONDENSATION PRODUCTS THEREFROM

Paul D. Morton, Riverview, Mich., assignor to Sharples Chemicals Inc., a corporation of Delaware No Drawing. Application June 30, 1945,
Serial No. 602,653

15 Claims. (Cl. 260—9)

The present invention pertains to the art of synthetic resins and particularly to the manufacture of certain novel resins resulting from condensation of urea with sugars and aldehydes.

Proposals have heretofore been made to form condensation products by reacting sugar with urea, and to use these condensation products as treating agents for the sizing and other treatment of textiles. It has also been proposed that a sugar be condensed with formaldehyde and the resulting condensation product be thereafter reacted with urea to produce a plastic substance. Another proposal has been that the urea be reacted with formaldehyde, and the resulting condensation product be thereafter reacted with sugar to form a synthetic resin.

A feature of the present invention consists in that it provides a procedure for forming a condensation product superior to those of the above-mentioned prior art in that it is a thermo-setting product having unusually effective resistance to attack by water. As pointed out hereinafter, it is possible to obtain, by practice of this invention, a clear aqueous resin solution which, upon heating or simple air drying, will yield a hard water-resistant transparent film. These resinous condensation products are useful as adhesives, in the treatment of textiles, and as additives for increasing the wet strength of paper. It is also possible, by slight modification in technique, to form transparent molded products in practice of the invention. The superior results attained in practice of the present invention are attributable to the practice of a sequence whereby a suitable aldehyde, such as formaldehyde or equivalent methylene-containing body, is reacted with the remaining constituents only after these constituents, to wit, the sugar and urea, have been condensed with each other.

In order to facilitate an understanding of the present invention, it will first be described in reference to a preferred procedure for forming an aqueous resin solution, and then discussed in relation to certain variants which may be adopted to produce specific modifications in the character of the resinous condensation product. The first step in practice of the present invention is distinguished from the prior art involved in manufacture of resins from sugar, formaldehyde and urea, in that, in the practice of the present invention, the sugar and urea are first condensed to form a preliminary condensation product of these two constituents, before the condensation with formaldehyde is performed. This first step may be accomplished by melting the urea in a suitable receptacle equipped with means for introducing the urea and sugar and for removing ammonia during the course of the reaction. The urea is stirred during continuous addition of the sugar, and a hydrocarbon entraining agent, such as xylene, is employed to carry overhead the ammonia liberated during the course of the reaction. The evolution of ammonia usually starts at about 140° C., and the mass is preferably heated to a temperature between 160 and 165° C. during the course of the reaction, which usually requires between 2 and 4 hours for completion. Completion of the reaction with respect to the urea under treatment is attained when an amount of ammonia which is equimolecular with respect to the urea under treatment is passed overhead.

The sugar carbamate product resulting from condensation of the sugar with the urea as discussed above, is next condensed with formaldehyde or its equivalent. According to preferred procedure, a substantial excess of aqueous formaldehyde solution containing a small quantity of an acid, basic or neutral catalyst, is heated to a temperature of about 85° C., and the sugar carbamate condensation product is added in increments, care being taken to obtain a clear solution after each increment before the subsequent one is added. Heating may be continued after the addition of the last increment, in order to insure complete condensation, and the solids content of the resulting aqueous solution may be adjusted by evaporation of excess water, or addition of water, to produce a solution of the desired concentration.

In order to obtain a product of optimum thermosetting and water-resistant properties by the above-described preferred procedure, it is best that the initial condensation between the sugar and the urea occur in approximately equimolecular proportions; i. e., that one mole of urea be provided per each combining weight of saccharide unit of the sugar. Wide variations in this ratio are permissible within the broad scope of the invention, however, depending upon the qualities desired in the product of condensation of the resulting sugar carbamate reaction product with formaldehyde. Thus, the weight ratio of urea to sugar may vary between 9:1 and 1:9, depending upon the nature of the product desired. If a high ratio of urea to sugar be employed, the excess urea will combine with the formaldehyde in the ensuing formaldehyde condensation reaction to modify the properties of the resinous condensation product. In general, if the ratio of urea to sugar is reduced below the stoichiometric ratio, the products tend to become softer, and by use of a very low ratio of urea to sugar, the ultimate formaldehyde condensation product may be made to be soft, tacky and thermoplastic.

As noted above, the sugar carbamate intermediate products of the present invention are not only useful for condensation with formaldehyde and equivalent compounds alone, but they may also be combined with other urea derivatives, such as urea, thiourea, alkyl ureas, or alkylol ureas for co-condensation with the aldehyde. By combining 25 parts of the sugar carbamate product resulting from condensation of sugar and urea with 75 parts of simple urea, for example, and condensing this mixture with formaldehyde, a condensation product is obtained which shows a marked improvement in moisture resistance over a corresponding product formed by condensation of urea alone with formaldehyde. As another alternative, by combining various ratios of alkylol urea with the sugar carbamate product, and condensing these mixtures with formaldehyde, products having a wide range of plasticity may be obtained depending upon the amount of alkylol urea employed.

Instead of using an aqueous formaldehyde solution, as in the preferred procedure discussed above, other equivalent methylene-containing bodies may be employed.

While the preferred procedure of the invention involves removal of the ammonia during the course of condensation of urea with sugar by the use of an entraining agent such as xylene or toluene, it is possible to remove the ammonia with the aid of air or an inert gas, such as nitrogen, or by use of a vacuum. For convenience, this positive step for the separation and removal of ammonia will be referred to in the claims by the term "stripping off ammonia," or its equivalent. The preferred temperature for the condensation of the sugar with the urea is between 100 and 200° C., depending somewhat upon the entraining agent or method used for removal of the ammonia.

The following examples illustrate practice of the invention:

Example I 300 parts of urea were melted and placed in a receptacle and 800 parts of granulated white cane sugar were added. The mixture was heated and stirred and xylene vapors were introduced below the surface, ammonia vapors being removed by entrainment in the xylene. The temperature was maintained for four hours between 140 and 160° C., until a quantity of ammonia had been collected which was equimolecular with respect to the urea under treatment. The resulting product was white and crystalline and was soluble in water in all proportions. This sugar carbamate was condensed with formaldehyde as follows.

100 parts of aqueous formaldehyde (37% solution) and one part of glacial acetic acid were heated in a beaker until the temperature reached 85° C., and 50 grams of the sugar carbamate were added in small portions, time being allowed to obtain a clear solution after each increment of addition before further quantities were added. Heating was continued for a few minutes after addition of the last increment of sugar carbamate to insure complete condensation, and the solids content of the reaction mixture was adjusted to 50%. The resulting aqueous solution of resin was found to be stable, clear and water white. Hard and tack-free films 0.003 of an inch thick were obtained from this solution in 30 minutes by baking at 105° C. When immersed in water for twelve hours, these films remained clear and unaffected by the water. A film of urea formaldehyde resin subjected to identical water treatment for comparative purposes disintegrated.

The incorporation of a small quantity of sulfuric acid (1 cc. of concentrated acid per 100 grams of resin) converted the condensation product into a condition in which it was capable of air-drying without application of heat. Films formed from the condensation product to which this acid was added dried to a hard and tack-free condition in 15 minutes at room temperature.

Example II

The same procedure was followed as in Example I, except that, in the initial condensation, 360 parts of urea were melted and reacted with 360 parts of sugar. The resin formed by condensation of the resulting sugar carbamate product with formaldehyde was similar to that of Example I, except that films formed from this resin were not so water-resistant as those of Example I.

The products of Examples I and II, when carefully dehydrated and ground into a powder, constitute excellent molding powders. Molded products may be formed from them by treatment at from 2000 to 5000 pounds pressures at temperatures between 100 and 175° C. These molded products are clear, transparent and water resisting.

While the products of the above examples were formed by use of granulated white cane sugar, any of the various sugars, involving mono-, di- or poly-saccharides, may be used in practice of the invention. The sugars may, for example, be in the form of glucose, invert sugar, levulose, sucrose, for example, cane sugar, or molasses.

Various modifications are possible within the scope of the invention, and I do not therefore wish to be limited except by the following claims.

I claim:
1. The resinous product resulting from the condensation of formaldehyde with one of the group consisting of sucrose carbamate, glucose carbamate and levulose carbamate.
2. The resinous product resulting from the condensation of formaldehyde with one of the group consisting of sucrose carbamate, glucose carbamate and levulose carbamate mixed with one of the group consisting of urea, and thiourea.
3. The resinous product resulting from the condensation of formaldehyde with sucrose carbamate.
4. The resinous product of claim 3 having a small quantity of sulfuric acid incorporated therein.
5. A process comprising condensing with the application of heat formaldehyde with one of a group consisting of sucrose carbamate, glucose carbamate and levulose carbamate.
6. A process comprising condensing with the application of heat formaldehyde with sucrose carbamate.
7. A process comprising condensing with the application of heat formaldehyde with sucrose carbamate mixed with one of the group consisting of urea, and thiourea.
8. The process of claim 5 in which formalde- hyde is present in the form of an aqueous solution.

9. The process of claim 6 in which formaldehyde is present in the form of an aqueous solution.

10. A carbamate selected from the group consisting of sucrose carbamate, glucose carbamate and levulose carbamate.

11. Sucrose carbamate.

12. A process for the production of a sugar carbamate comprising condensing in a substantially anhydrous system and in the absence of a catalyst and at a temperature between 100° C. and 200° C. urea with a sugar selected from the group consisting of sucrose, glucose and levulose, while simultaneously stripping off ammonia from the reaction mass.

13. The process of claim 12 in which the amount of ammonia stripped off is substantially equimolecular to the urea condensed.

14. The process of claim 12 in which the ammonia is stripped off with the aid of a hydrocarbon entraining agent.

15. The process of claim 12 in which condensation takes place between 140° C. and 165° C., and in which the sugar condensed is sucrose.

PAUL D. MORTON.

REFERENCES CITED

The following references are of record in the file of this patent:

UNITED STATES PATENTS

| Number | Name | Date |
|---|---|---|
| 1,862,270 | Kallner | June 7, 1932 |
| 2,145,695 | Mattiotto | Jan. 31, 1939 |
| 2,197,357 | Widmer | Apr. 16, 1940 |
| 2,364,726 | Landolt | Dec. 12, 1944 |
| 2,378,322 | Peterson | June 12, 1945 |

FOREIGN PATENTS

| Number | Country | Date |
|---|---|---|
| 208,193 | Great Britain | Dec. 11, 1923 |
| 209,697 | Great Britain | Jan. 11, 1924 |
| 480,958 | Great Britain | Feb. 28, 1938 |
| 813,990 | France | Mar. 8, 1937 |

OTHER REFERENCES

Hawk, Practical Physiological Chemistry (8th edition), page 449.

Todd and Sanford, Clinical Diagnosis (9th edition), pages 91 and 106–109.